No. 785,548. PATENTED MAR. 21, 1905.
A. P. GOULD.
DENTAL CHAIR.
APPLICATION FILED JULY 2, 1900.

5 SHEETS—SHEET 1.

Figure 1:
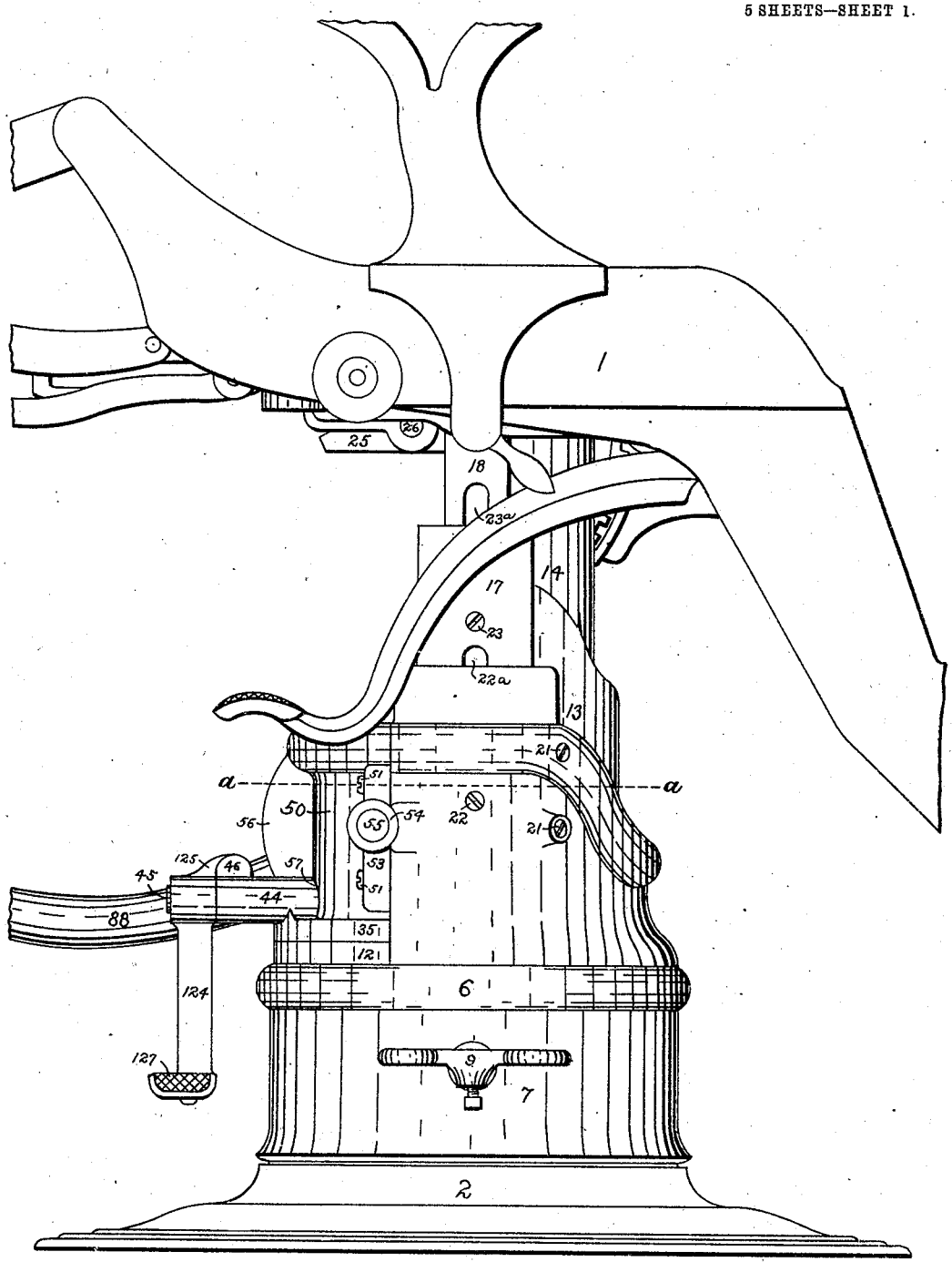

Witnesses: Fig.1. Inventor:
J. L. Maurer Aaron P. Gould,
Ernest Beaumont By Harry Frease, Attorney.

No. 785,548. PATENTED MAR. 21, 1905.
A. P. GOULD.
DENTAL CHAIR.
APPLICATION FILED JULY 2, 1900.

5 SHEETS—SHEET 4.

Witnesses:
J. L. Maurer
Ernst Beaumont

Inventor:
Aaron P. Gould,
By Harry Frease, Attorney.

No. 785,548. PATENTED MAR. 21, 1905.
A. P. GOULD.
DENTAL CHAIR.
APPLICATION FILED JULY 2, 1900.
5 SHEETS—SHEET 5.
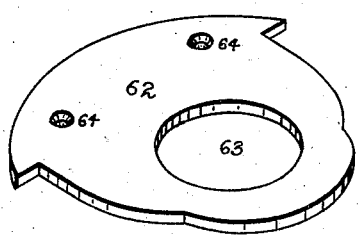
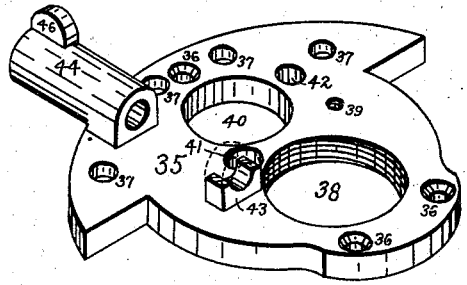
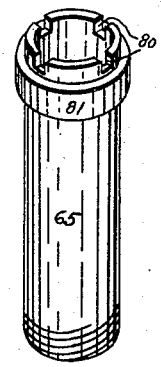
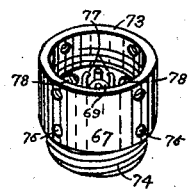
Witnesses:
J. L. Maurer
Ernest Beaumont
Inventor:
Aaron P. Gould,
By Harry Frease, Attorney.

No. 785,548. Patented March 21, 1905.

UNITED STATES PATENT OFFICE.

AARON P. GOULD, OF CANTON, OHIO.

DENTAL CHAIR.

SPECIFICATION forming part of Letters Patent No. 785,548, dated March 21, 1905.

Application filed July 2, 1900. Serial No. 22,303.

*To all whom it may concern:*

Be it known that I, AARON P. GOULD, a citizen of the United States, residing at Canton, in the county of Stark and State of Ohio, have invented certain new and useful Improvements in Dental Chairs, of which the following is a specification.

My invention relates to that class of dental chairs in which the body of the chair is raised and lowered with reference to said base by means of a fluid, preferably oil, utilized by a pump-and-piston mechanism, and the objects of said improvements being, first, to provide such a mechanism as will be easily understood by unskilled users, that can be operated in a cleanly manner externally and internally, and in which the oil-reservoir and the valves and other parts of said mechanism may be removed for cleaning or repairing without disturbing the remainder of the chair; second, to provide a suitable vertically-extending base in which the extension slides or guides can be controlled and adjusted to a close and neat fit, thus giving firm support and steadiness to the chair in all positions. I attain these objects by the mechanism illustrated in the accompanying drawings, in which—

Figure 2:
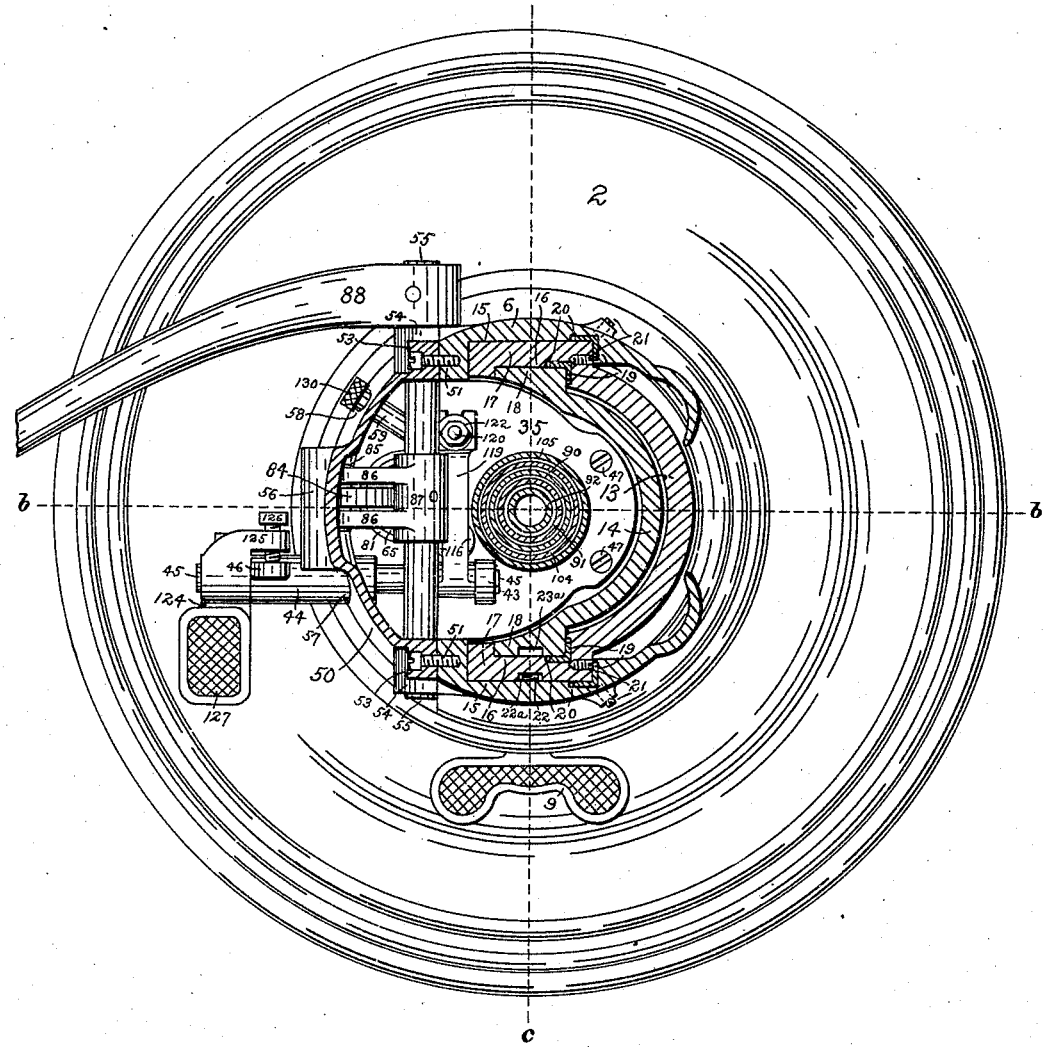
Figure 3:
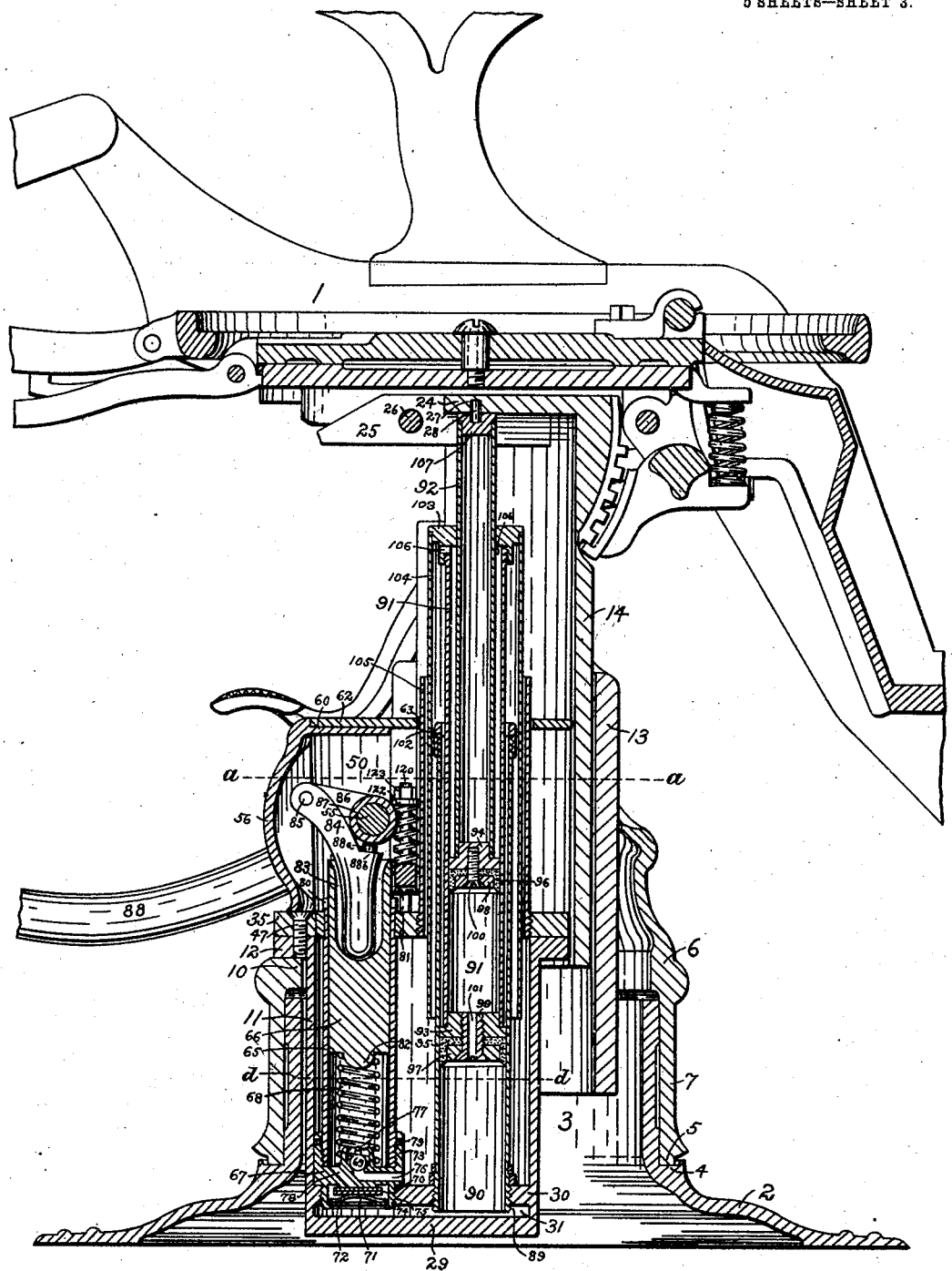
Figure 5:
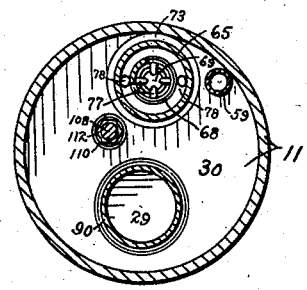
Figure 4:
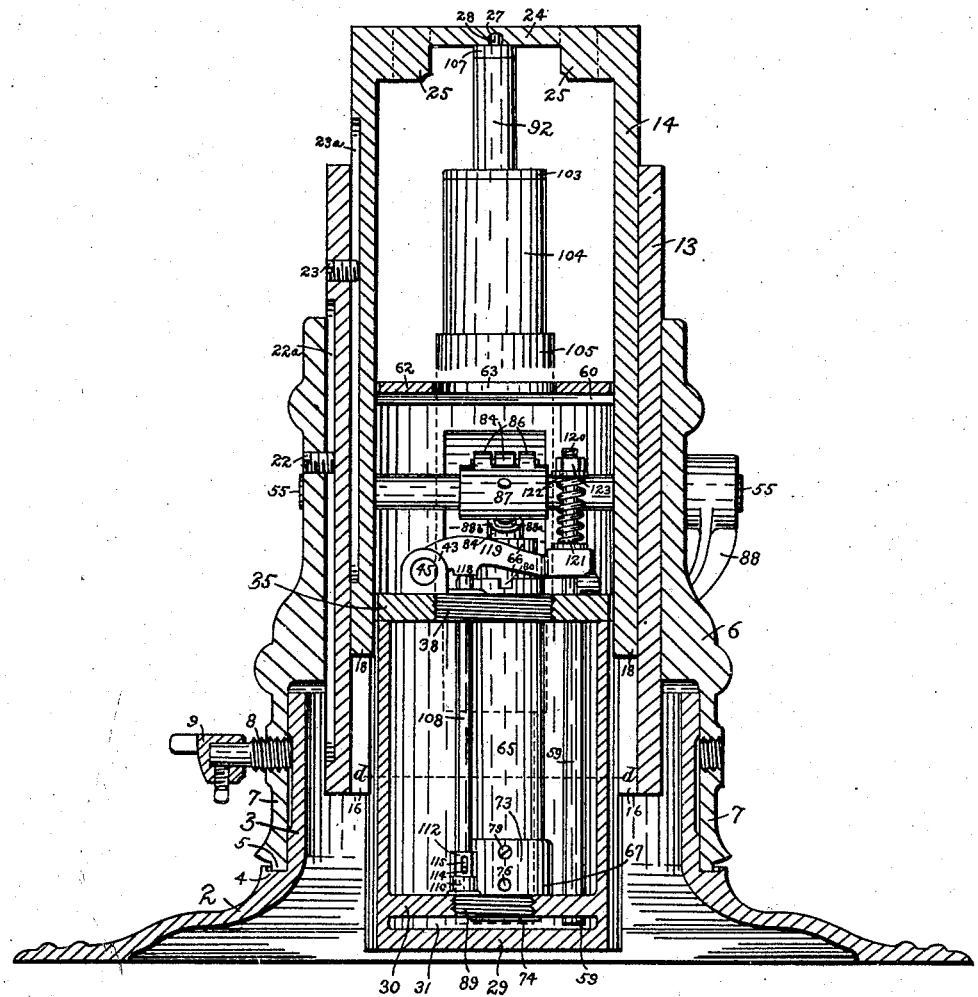

Figure 1 is a right side elevation of the base and part of the body of the chair; Fig. 2, a horizontal section on the line *a a*, Figs. 1 and 3, looking down; Fig. 3, a vertical section of the chair-base and supports on the line *b b*, Fig. 2, looking from the right, showing the pump and chair-body in section; Fig. 4, a vertical section on the line *c c*, Fig. 2, looking to the rear, with lower part of the piston-cylinders and casings omitted; Fig. 5, a horizontal section of the oil-reservoir on the line *d d*, Figs. 3 and 4, looking down. Fig. 6 represents detached isometric views of the oil-reservoir, the cover thereof, the detachable casing, and the top plate thereof, all in relative position for assembling; Fig. 7, detached isometric views of the pump plunger, cylinder, and valve parts, all in relative position for assembling. Fig. 8 is a fragmentary vertical section showing the discharge-pipe and manner of fastening the oil-reservoir and cover; Fig. 9, a fragmentary vertical section showing the release-valve, and Fig. 10 a detached isometric view of one slide-adjusting angle-bar or gib.

Similar numerals refer to similar parts throughout the several views.

The body 1 of the chair may be made in any well-known manner suitable in the class. The fixed base 2 is circular in form, open at the top and bottom, with an upwardly-projecting cylindrical portion 3 and an external annular groove 4 around the bottom of said cylindrical portion formed for receiving the lower edge 5 of the revolving base 6. The revolving base 6 in its lower part 7 is also cylindrical in form, open at the top and bottom, and adapted to fit neatly but freely over the upper portion 3 of the fixed base, with its lower edge 5 shaped to travel in the groove 4 in the fixed base, thus forming a substantial bearing for the horizontal rotation of the revolving base 6 and the parts thereto attached. The fixed and revolving bases may be set with reference to each other by the screw 8 and its adjustable butterfly 9, designed to be turned by the operator's foot and to be located on either side of the chair.

At the top of the cylindrical part 7 of the revolving base is formed an inwardly-projecting flange 10, which conforms to the outline of the oil-reservoir 11 and is a support for the outwardly-projecting flange 12 thereof, below described. The upper part of the revolving base 6 may be of the form shown or of any other suitable section to properly incase the parts and form a sufficient guide and support for the raising and lowering of the extension parts 13 and 14, which telescope, respectively, within it. In the interior and on opposite sides of the revolving base 6 and the extension part 13 are provided, respectively, the vertical channels or boxings 15 and 16, which are formed to fit, respectively, the vertical tongues or slides 17 and 18, formed externally and on opposite sides of the extension parts 13 and 14, respectively. These boxings and slides respectively form the bearings and guides for the vertical movements of the telescoping parts 13 and 14. An angle-bar or gib 19 is placed in a recess 20 at one angle of each boxing above described, and the same is adjusted, by means of screws 21, to take up any looseness there may be in said vertical bearings. The shapes of the ends of said screws 21 are varied to suit the direction of their contact with the angle of the gib, as shown in Fig. 2. The vertical movements of the telescoping parts 13 and 14 with reference to each other and to the revolving base proper, 6, are limited by the screws 22 and 23, which enter, respectively, through the sides of the revolving base 6 and the telescoping part 13 into the vertical grooves 22$^a$ and 23$^a$, respectively, in the outer faces of the slides 17 and 18. These grooves are as long as it is desired to give vertical movement to the parts, and the ends thereof, in connection with the screws 22 and 23, respectively, act as stops to further movement. The upper end of the telescoping part 14 is closed over by the plate 24, from which project rearward the two arms 25, to which a pivotal connection is provided for the body 1 of the chair by the bolt or rod 26. On the under side of the plate 24 and in line with the center of the chair-base is the recess 27, adapted to receive the pin 28, below described.

The oil-reservoir 11 is preferably cylindrical in form, with a tight bottom 29 and a diaphragm 30 a short distance thereabove, forming the space 31 between the same. The oil-reservoir 11 is open at the top, where are provided in the rear the external flange 12, above mentioned, and in the fore the external flange 32. These flanges are provided with the threaded holes 33, and the flange 12 is provided with the smooth holes 34 for the attaching-screws below described. The oil-reservoir cover 35 is a plate corresponding in outline with the top of the reservoir and its flanges. The cover 35 is provided with the holes 36 and 37, corresponding, respectively, with the holes 33 and 34 in the reservoir-flanges, which cover-holes are reamed or recessed, respectively, to receive the screw-heads below described. The cover 35 is also provided with the threaded holes 38 and 39 and the smooth holes 40, 41, and 42 for receiving various parts of the mechanism described below. On top of the cover 35 are the lug 43 and the boxing 44, in which are formed bearings for the shaft 45. On top of the boxing 44 at its rear end is the ear 46. The cover 35 is attached to the reservoir 11 by means of screws 47, passing through the holes 36 into the holes 33, and the two together are securely fastened to the flange 12 of the revolving base by screws 48, passing through the holes 37 in the cover and 34 in the reservoir-flange into the threaded holes 49 in said flange 12.

Above and resting on the cover 35 is the detachable casing 50, which is substantially a completion to the rear of the upper part of the revolving base 6, except that it is detachable therefrom. The casing 50 is securely attached to the revolving base 6 by the screws 51, passing through holes 52 in the reinforced parts 53 at the opposite sides of said casing. In the reinforced parts 53 are also formed journal-bearings 54 for the transverse shaft 55. The shell of the casing 50 is swelled or enlarged to the rear, as at 56, to accommodate the mechanism within, and in its lower edge are the notches 57 and 58, fitting, respectively, over the boxing 44 and the discharge-pipe 59. The top of the casing 50 is closed over by the web 60, in which are the threaded holes 61. To the web 60 is attached the top plate 62, which extends horizontally forward and conforms in shape to the inner face of the telescoping part 14 of the revolving base, completely closing the space above the oil-reservoir 11. The top plate 62 has the smooth hole 63 in line with the hole 38 in the reservoir-cover and the holes 64 for ordinary screws passing therethrough into the holes 61 in the web 60 to make the attachment therewith. The web 60 and the top plate 62 may be formed integral, if desired; but I have preferred to make them separate, as shown.

In the rear part of the oil-reservoir 11 is located a pump composed of the cylinder 65, the plunger 66, the valve-case 67, the spiral spring 68, the ball-valve 69, the disk valve 70, the cross-spring 71, and the retaining-ring 72. The valve-case 67 is in form of a disk, with an internally-threaded collar 73, extending upward, receiving the threaded lower end of the cylinder 65, and an externally-threaded collar 74, extending downward, turning into the threaded hole 75 through the diaphragm 30 of the oil-reservoir. One or more passage-ways 76 extend from the outer face horizontally through the disk portion of the valve-case 67 to its middle, thence upwardly, and opening in a seat for the ball-valve 69. The ball-valve is guided to its seat by the prongs 77 around said opening, which prongs are bent in at the top to prevent its escape. The lower end of the spiral spring 68 rests around the base of the prongs 77. One or more passage-ways 78 extend from the upper face of the disk portion of the valve-case 67, outside the spiral spring 68 diagonally downward and inward to about the middle of the lower face thereof. The disk valve 70 is placed against this lower face and is normally held there by the cross-spring 71, which rests on the ring 72, which is held in place by slightly turning or riveting in the lower edge of the collar 74. The disk valve 70 may be made of one piece of suitable material, but is preferably made, as shown, of a leather disk above and a metallic disk below riveted together. With the valve parts in place the cylinder 65 and the valve-case 67 may be set together by the screws 79 and the two parts as one turned into or out of the hole 75 through the diaphragm by a wrench or other tool applied in the notches 80 at the top of said cylinder. The cylinder 65 in its length projects through the hole 40 in the oil-reservoir cover to a short distance above it, the hole 40 being sufficiently large to pass freely through it all parts of the pump, and a collar 81 is shrunk or soldered around the upper part of the cylinder 65 to fill said hole and steady the cylinder. The plunger 66 is cylindrical in outer form and of a diameter to neatly fill the cylinder 65 and has a round stud 82 on its lower end, about which is placed the upper end of the spiral spring 68, and a circular recess 83 in its upper part extending down to about the middle of the plunger. The plunger 66 is actuated upward by the spiral spring 68 against its lower end, and it is actuated downward by the lower end of the push-bar 84 acting against the bottom of the recess 83. The push-bar 84 extends upward, curving to the rear, and at its upper end is pivoted by the bolt or pin 85 between the rear ends of the arms 86, which extend backward from the collar 87, mounted on the transverse shaft 55, to which said collar is keyed or set by ordinary means. One end of the shaft 55 extends outside of the casing 50, to which end is securely attached the operating arm or lever 88, which extends to the rear and is designed to be depressed at its rear end by the operator's foot, the action of the spiral spring 68 through the mechanism last above described raising the arm or lever when the same is released from pressure. This movement is limited by the stop-pin 88$^a$, preferably of hard wood, located in the shoulder 88$^b$, formed on the forward edge of the push-bar 84, acting against the lower side of the collar 87.

Through the threaded hole 89 in the forward part of the diaphragm 30 is screwed the threaded lower end of the piston-cylinder 90, which extends down into the space 31 below said diaphragm, but not quite to the bottom of the oil-reservoir, leaving space for a free passage of oil into said cylinder. Within the cylinder 90 are telescoped successively the subcylinder 91 and the tube 92, at the respective lower ends of which are the plugs or piston-heads 93 and 94, to the lower ends of which are fastened, respectively, the packing (preferably leather) 95 and 96 by the respective washers 97 and 98 and the respective screws 99 and 100. The screw 99 is perforated lengthwise by the passage-way 101, which connects the interior of the cylinder 90 with the interior of the subcylinder 91. At the upper ends of the cylinder 90 and the subcylinder 91 are the caps, respectively, 102 and 103, which fit and guide, respectively, the subcylinder 91 and the tube 92. To the outer edge of the cap 103 is soldered or otherwise attached the tubular shield 104, which extends down freely around the cylinder 90 and its cap 102 into the oil-reservoir 11. The shield 104 protects the contained parts from damage and from dirt or grit and also protects the operator and others from the oil which may work up the outside of the subcylinder 91 and carries the same down into the reservoir. These parts are surrounded by the tubular casing 105, the lower end of which is threaded and screwed into the hole 38 in the reservoir-cover. The casing 105 in its length extends upward through the hole 63 in the top plate 62 and above far enough to include the subcylinder 91 and the tube 92 when the same are telescoped or nested in the cylinder 90. At the upper end of the subcylinder 91 and extending through the cap 103 are the holes 106, through which oil that may escape outside of the tube 92 above the packing 96 can find its way out and down inside the shield 104 to the reservoir. The upper end of the tube 92 is closed by the plug or cap 107, which carries the pin 28, above mentioned. The plate 24 rests on the cap 107, which is the point of support by which the telescoping part 14 of the revolving base and the superimposed chair-body 1 are raised or lowered. The cylinder 90 and its telescoping parts are located concentric with the base of the chair and substantially so with the weight carried thereon, and thus there is always freedom of movement without any binding in the extension of the various parts.

The release-valve is in form of a valve-rod 108, with its lower end suitably diminished to rest in the seat 109 of the casing 110. The casing 110 is screwed through the threaded hole 111 in the diaphragm 30 to the space 31 below and an upwardly-extending collar 112, somewhat larger than the valve-rod 108, carries the slots 113 on opposite sides, in which the pins 114, extending from opposite sides of the valve-rod 108, have free movement up and down within the limits of said slots, but at the same time render said valve-rod non-rotatable with reference to the casing 110. The valve-rod 108 extends upward through the hole 41 in the reservoir-cover and a short distance above, terminating in a head for a wrench, or, as shown, is provided with a slot 115 for a screw-driver, by which and by reason of the non-rotatability of the valve-rod with reference to the valve-casing the valve-casing 110 can be turned into and out of the hole 111 in the diaphragm. The hole 41 in the reservoir-cover is sufficiently large to freely pass the valve-casing 110 and is filled by the plug or collar 116, fitting loosely around the valve-rod 108, being carried by the flanged upper edge 117. The release-valve is normally closed by pressure of the projecting face 118 on the lower side of the arm 119 against the upper end of the valve-rod 108. One end of the arm 119 is mounted on the shaft 45 and is keyed or set thereto by ordinary means. The other end is forked, the two divisions extending on either side of the vertical rod 120, which is screwed into the hole 39 in the reservoir-cover. This end of the arm 119 is normally depressed by action of the spiral spring 121, located above it around the rod 120, with suitable washers 122 above and below, which spring is supported and adjusted from above by the nut 123 on the upper end of the rod 120. The shaft 45 is actuated by the arm or lever 124, which is securely attached to the rear end of said shaft, which is extended for that purpose beyond the boxing 44. A lug 125 extends upward and forward from the upper end of the lever 124, carrying the adjusting-screw 126, which acts against the ear 46 on the boxing 44 as a stop to limit the rotation of the shaft 45 in one direction. The lever 124 terminates at its lower end in a pedal 127 for the operator's foot. The release-valve is allowed to open by pressure on the pedal 127, which turns the shaft 45 and raises the arm 119, compressing the spiral spring 121, which movement is controlled and limited by adjustment of the screw 126. If there is pressure on the lower end of the valve-rod 108, the same is then free to rise from its seat, giving free passage around it and either through the slots 113 or over the top of the collar 112 into the oil-reservoir. When pressure is removed from the pedal 127, the spiral spring 121 depresses the arm 119, and thereby the valve-rod 108, thus closing the release-valve. The simplicity of construction of the release-valve allows the flow of oil through it to keep it clean; but as a safeguard to keep out foreign particles the screen 128 may be fastened across the lower opening of the valve-casing 110.

To empty the oil-reservoir 11, the discharge-pipe 59 is screwed at its lower threaded end through the threaded hole 129 in the diaphragm 30 to within a short distance of the bottom of the oil-reservoir. The pipe extends upward through the hole 42 in the reservoir-cover, thence outward through the notch 58 in the detachable casing, and is ordinarily closed by the plug or cap 130. When used for emptying the reservoir, the plug 130 is removed, and a section of hose 131 may be attached, through which the oil can be conducted to a convenient receptacle.

It will be noted that the space 31 below the diaphragm 30 in the oil-reservoir is the common means of communication between the respective parts of the pump-and-piston mechanism—that is, between the pump, the piston-cylinder, the release-valve, and the discharge-pipe.

In use sufficient oil is placed in the reservoir 11 to fill the necessary parts. The body 1 of the chair is raised by a downstroke of the pump-plunger 66, caused by action of the operator's foot on the free end of the lever 88. The ball-valve 69 checks a flow of oil through passage-ways 76, and the same is forced through the passage-ways 78, depressing the disk valve 70 and flowing around the same, through the arms of the cross-spring 71 and through the retaining-ring 72 into the space 31 beneath the diaphragm 30. Thence oil is forced up into the cylinder 90 against the piston-head 93 and also through the passage-way 101 in the screw 99 into the subcylinder 91 against the piston-head 94, which action elevates the subcylinder 91 and the tube 92, and thereby the telescoping parts 13 and 14 in turn of the revolving base and the body 1 of the chair resting thereon. At the completion of a stroke pressure of the foot is removed from the lever 88, when the spiral spring 68 elevates the plunger 66, the disk valve 70 by suction or by action of the cross-spring 71 closes the lower openings of the passage-ways 78, checking a return of oil from the space 31, and the pump-cylinder 65 is filled by suction with oil from the reservoir 11 through the passage-ways 75, lifting the ball-valve 69 to make way, after which the pump is ready for another stroke.

To lower the chair-body 1, the release-valve is allowed to open by action of the operator's foot on the pedal 127, as described above, and the compressed oil in the space 31 flows through the valve-casing 110 into the reservoir 11, its place being taken by oil from the cylinder 90 and the subcylinder 91, which is followed down by the piston-heads 93 and 94 and the parts above.

To remove the oil from the reservoir 11, the plug 130 of the discharge-pipe 59 is replaced by the hose 131, and an operation of the pump expels the oil from the reservoir through said discharge-pipe and hose.

To remove any particular part of the pump-and-piston mechanism, the body 1 of the chair and the telescoping part 14 of the revolving base are blocked up by a convenient post or strut and the weight of the same removed from the top of the tube 92, which may then be lowered with the subcylinder 91, so as to nest within the cylinder 90. The detachable casing 50 and the top plate 60 can then be removed, together or separately, by turning out the respective screws by which they are held, as described above. The detachable casing 50 carries with it the transverse shaft 55 and its attached parts, including the push-bar 84, which withdraws from the recess 83 in the pump-plunger. This done, any part of the pump-and-piston mechanism can be removed and replaced from above the reservoir-cover 35, or if it be desired to remove the oil-reservoir 11 with its contents or the cover 35 thereof this can be done by turning out the respective screws which attach the same as described above, all of which can be done without disturbing or detaching any other part of the chair or base because of the peculiar construction described above and because of the special shape of the extension parts 13 and 14, which in section are substantially semicircular in form, following the forward outline of the reservoir 11 and its cover and being open in the rear exposes the pump-and-piston mechanism, except when the same is covered by the detachable casing 50 and its top plate 62, and all of which can be done and at the same time the use of the chair continued with all of its adjustments operative, save only that of raising and lowering the body by the removed mechanism, which continued use becomes an important matter perchance it is necessary to send some part of the removed mechanism to a factory for repairs.

Having described my invention, what I claim as new, and desire to secure by Letters Patent, is—

1. In a dental chair, a revolving base resting on a relatively fixed base, concave telescoping extension parts in the revolving base supporting the chair-body, a reservoir resting in the revolving base and extending within the concave sections and being adapted to be removed from the base without removing the extension parts.

2. In a dental chair, a reservoir with a cover attached thereon, a pump composed of a valve-case carrying suitable valves and removably attached within the reservoir, a cylinder having fixed attachment to the valve-case and extending through and above an opening in said cover adapted to pass the parts, with means thereabove for attaching and detaching said cylinder and case without removing said cover, and a plunger with means for operating the same, substantially as specified.

3. A pump-actuating device composed of a push-bar having a stop-pin in a shoulder on one edge, from which said bar curves in opposite direction to a pivotal connection with the ends of arms extending from a rocker-shaft located adjacent to the stop-pin, with means for journaling and turning said shaft, a reciprocating plunger acting in the pump-cylinder, the free end of the push-bar actuating positively said plunger, substantially as specified.

4. In a dental chair, a reservoir having a tight bottom and a diaphragm thereabove with space between, a pump extending through said diaphragm forcing oil from the reservoir proper into said space, and a discharge-pipe also extending through said diaphragm leading from said reservoir receiving oil from said space, with means for controlling the outlet of said pipe, substantially as specified.

5. In a dental chair, a reservoir, a release-valve attached therein composed of a valve-casing containing a valve-seat and having an upwardly-projecting collar carrying vertical slots, and a rod-valve provided with lateral pins adapted to enter and travel in said slots, with means for closing and releasing said rod-valve, substantially as specified.

6. In a dental chair, a reservoir with a cover attached thereon, a release-valve having its case removably attached within the reservoir, said valve extending through and above an opening in the cover adapted to pass the valve and its case, with means for attaching and detaching said valve and its case without removing said cover, substantially as specified.

7. In a dental chair, a reservoir with a cover thereon, and a release-valve composed of a valve-case attached in said reservoir and a relatively non-rotatable valve-stem extending through and above an opening in said cover adapted to pass the parts of the valve, without removing the cover thereof.

8. In a dental chair, a reservoir with a cover attached thereon, a discharge-pipe having its inlet end removably attached near the bottom of the reservoir and extending through and above an opening in said cover adapted to pass said pipe, substantially as specified.

9. In a dental chair, a relatively fixed base, a cylindrical revolving base on said fixed base, semicircular extension parts in said revolving base, a section of the upper part of the revolving base corresponding to the open side of said extension parts being detachable, substantially as specified.

10. In a dental chair, a relatively fixed base, a cylindrical revolving base on said fixed base, semicircular extension parts in said revolving base, a section of the upper part of the revolving base corresponding to the open side of said extension parts being detachable, and journal-bearings located in the reinforced sides of said detachable section, substantially as specified.

11. In a dental chair, a reservoir with a cover attached thereon, a pump, a piston-cylinder, a release-valve and a discharge-pipe, respectively having their lower ends removably attached near the bottom of said reservoir, and extending through and above openings in said cover adapted to pass them respectively, substantially as specified.

In testimony whereof I have signed my name to this specification in presence of two subscribing witnesses.

AARON P. GOULD.

Witnesses:
ERNEST BEAUMONT,
J. L. MAURER.